(12) United States Patent  
Kasatkin

(10) Patent No.: US 8,793,506 B2
(45) Date of Patent: Jul. 29, 2014

(54) MECHANISM FOR FACILITATING ENCRYPTION-FREE INTEGRITY PROTECTION OF STORAGE DATA AT COMPUTING SYSTEMS

(75) Inventor: Dmitry Kasatkin, Vantaa (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/601,969

(22) Filed: Aug. 31, 2012

(65) Prior Publication Data

US 2014/0068274 A1 Mar. 6, 2014

(51) Int. Cl.
*G06F 21/00* (2013.01)
*H04L 29/06* (2006.01)

(52) U.S. Cl.
USPC ........... 713/189; 713/155; 713/168; 711/122; 709/219

(58) Field of Classification Search
USPC ......... 713/189, 193, 155, 156, 194, 168, 190; 711/122; 709/219
See application file for complete search history.

(56) References Cited

U.S. PATENT DOCUMENTS

2006/0294206 A1* 12/2006 Graveline et al. ............. 709/219
2008/0005587 A1* 1/2008 Ahlquist ....................... 713/190
2008/0082819 A1* 4/2008 Brizek et al. .................. 713/168
2011/0153944 A1* 6/2011 Kursawe ....................... 711/122
2012/0185683 A1* 7/2012 Krstic et al. .................. 713/193

FOREIGN PATENT DOCUMENTS

EP 1944711 A1 * 7/2008

OTHER PUBLICATIONS

Aaram Yun, Chunhui Shi, Yongdae Kim; "On protecting integrity and confidentiality of cryptographic file system for outsourced storage"; Nov. 2009; CCSW '09: Proceedings of the 2009 ACM workshop on Cloud computing security; Publisher: ACM; pp. 67-75.*

* cited by examiner

*Primary Examiner* — Hadi Armouche
*Assistant Examiner* — Courtney Fields
(74) *Attorney, Agent, or Firm* — Blakely, Sokoloff, Taylor & Zafman LLP

(57) ABSTRACT

A mechanism is described for facilitating encryption-free integrity protection of storage data at computing systems according to one embodiment. A method of embodiments of the invention includes receiving a read request, from a software application at a computing device, to perform a read task relating to a first data block of data stored at a storage device coupled to the computing device. The read task may include reading the first data block. The method may further include accessing a first reference cryptographic code at a first metadata cache associated with the first data block, calculating a first new cryptographic code relating to the first data block, comparing the first new cryptographic code with the first reference cryptographic code, and accepting the read request if the first new cryptographic code matches the first reference cryptographic code. The accepting may further include facilitating the read task.

22 Claims, 6 Drawing Sheets

MECHANISM FOR FACILITATING ENCRYPTION-FREE INTEGRITY PROTECTION OF STORAGE DATA AT COMPUTING SYSTEMS

FIELD

Embodiments of the invention relate to security systems. More particularly, embodiments of the invention relate to a mechanism for facilitating encryption-free integrity protection of storage data at computing systems.

BACKGROUND

Data security is a well-known branch of computer security that provides security for storage data against theft, corruption, natural disasters, etc. However, conventional systems for providing data security are limited and inefficient. For example, may conventional systems rely on data encryption to simply hide the data which can be intercepted and their integrity can be attacked through, for example, offline modifications. Additionally, these conventional systems are resource-inefficient and power-consuming and yet do not provide protection for any unencrypted portions of storage data.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
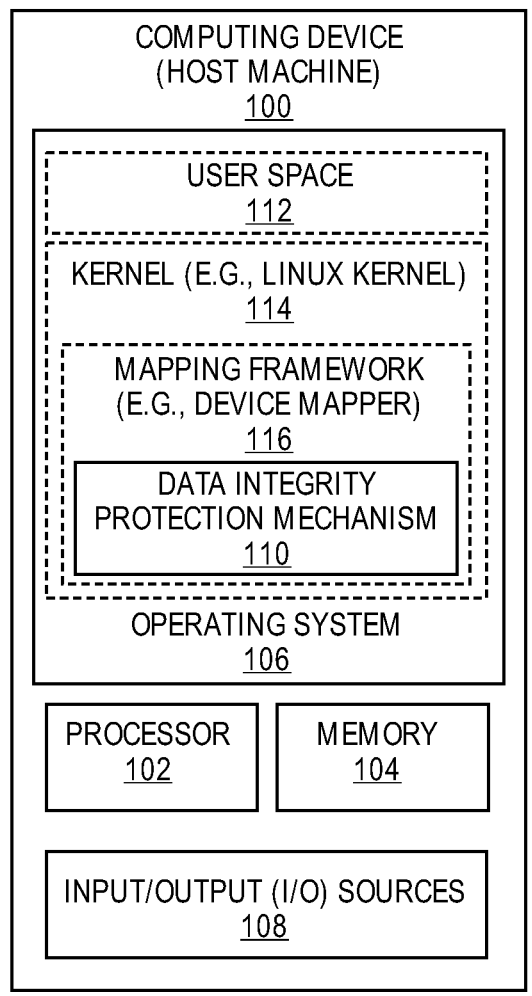
FIG. 1 illustrates a mapping framework-based mechanism for encryption-free protection of storage data employed at a computing device according to one embodiment.

In the following description, numerous specific details are set forth. However, embodiments of the invention may be practiced without these specific details. In other instances, well-known circuits, structures and techniques have not been shown in details in order not to obscure the understanding of this description.

Embodiments facilitate providing security and maintaining integrity of storage data against any unintentional or intentional modifications, such as due to hacking attacks, thefts, corruption, natural or man-made disasters, etc. Embodiments may provide a mechanism for facilitating encryption-free integrity protection of storage data at computing systems, where the mechanism may be mapping framework-based or implemented as a block device driver, etc., which, for example, may help store hash-based message authentication code (HMAC). For example, embodiments provide for device mapper-based security and integrity of storage data (e.g., data accessed by an operating system) against any modifications (e.g., offline modifications, etc.) through a secure internal calculation and verification mechanism (e.g., HMAC) without having to, for example, move or change the storage hardware, encrypt/decrypt storage data, etc. By facilitating security and integrity of storage data without having to encrypt the data, allows the storage data to remain unencrypted and thus, facilitating easier access and recovery of data, when necessitated. Moreover, without having to encrypt the storage data provides for a better resource efficiency and low consumption of power.

Data on a storage device may be organized in sectors, e.g., 512, bytes, and regarded as the minimal unit of read and write operations. Sectors refer to groups in blocks, such as a 4K block may include 8 sectors. It is contemplated that sector and/or block sizes may vary. Further, a file system typically operates with blocks and may issue read/write requests, such as a read request to read one or more blocks which, in case of a single block, typically translates to, for example, reading all 8 sectors of a data 4K block. Regarding a storage device (SD), an entire storage may be divided into partitions, where each partition may consist of several blocks; for example, a storage device SDA may be divided into partitions, such as sda1, sda2, sda3 and so forth. These partitions may be formatted to different file systems, such as ext4, File Allocation Table (FAT), New Technology File System (NTFS) by Microsoft® Corporation, etc., such as sda1 may be an ext4, sda2 may be an NTFS, etc. Further, file systems may call one or more block layers to read data blocks, such as when a read request is issued, a file system may immediately call a block layer, while when a write request is issued, pages may be updated but they may not immediately be writing to a block device. Such pages may be referred to as page-cache. Page-cache may be written back to the block device during the write-back operation and, during that, the file system may send a write request to the block layers.

Embodiments provide for a mechanism for facilitating encryption-free integrity protection of storage data that is implemented in a mapping framework as is described throughout this document, but it is contemplated that these embodiments are not limited to the mapping framework, such that a block device driver may be used instead to implement the mechanism.

FIG. 1 illustrates a mapping framework-based mechanism for encryption-free protection of storage data employed at a computing device according to one embodiment. Computing device 100 serves as a host machine to employ mapping framework-based mechanism for encryption-free protection of storage data ("integrity protection mechanism") 110 to facilitate security and integrity of data stored at one or more storage devices. In one embodiment, storage data protection mechanism 110 may be provided as a plugin module for a mapping framework 116 (also referred to as "device mapper") that is part of an operating system kernel 114 (e.g., Linux® kernel). Kernel 114 may serve as a component of operating system 106 for managing system resources, such as serving as a bridge or by facilitate communication between software applications (e.g., provided via user space 112) and any data processing done at the hardware level (e.g., hardware storage device). Mapping framework 116 may serve as a framework or mapper to map one block device to another block device, or to map a block at one device to a block at the same or other device, serving as a foundation for enterprise volume management system (EVMS), logical volume manager (LVM), dm-crypt, etc.

Computing device 100 may include mobile computing devices, such as cellular phones, including smartphones (e.g., iPhone® by Apple®, BlackBerry® by Research in Motion®, etc.), personal digital assistants (PDAs), etc., tablet computers (e.g., iPad® by Apple®, Galaxy Tab® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), televisions, in-vehicle entertainment systems, and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "host", "server", "memory server", "machine", "device", "computing device", "computer", "computing system", and the like, may be used interchangeably throughout this document.

Figure 2:
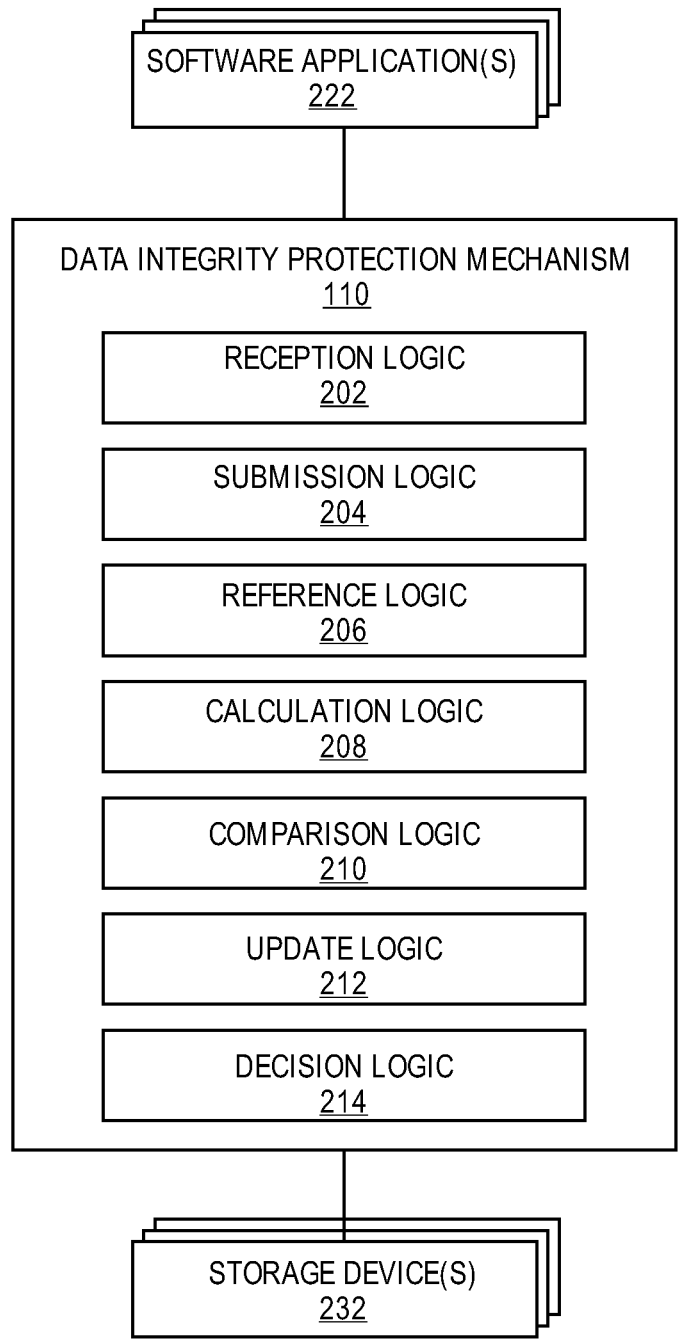
FIG. 2 illustrates a mapping framework-based mechanism for encryption-free protection of storage data at computing devices according to one embodiment.

FIG. 2 illustrates a mapping framework-based mechanism for encryption-free protection of storage data at computing devices according to one embodiment. In one embodiment, data integrity protection mechanism 110 includes a number of components, such as reception logic 202, submission logic 204, reference logic 206, calculation logic 208, comparison logic 210, update logic 212, and decision logic 214. As described previously with reference to FIG. 1, data integrity protection logic 110 may reside as part of an operating system and maintain communication between any number and type of software applications 222 and any number and type of storage devices 232 associated with a computing device, such as computing device 100 of FIG. 1. Throughout this document, the term "logic" may be interchangeably referred to as "processing logic", "component" or "module" and may include, by way of example, software, hardware, and/or any combination of software and hardware, such as firmware.

In one embodiment, data integrity protection mechanism 110 provides for security and integrity protection of data at one or more storage devices 232 coupled with the computing device. The storage data may be accessed and used by the operating system and/or one or more software applications 222 running at the computing device. For example, the data may include software codes, relevant sections of software codes, and/or any other relevant information, such as metadata cache, that may be accessed and used by the software applications 222 and/or the operating system. Examples of storage device 232 may include any number and type of storage systems, such as random access memory (RAM), redundant array of independent disk (RAID), non-uniform memory access (NUMA) memory systems, storage area networks, processor registers, memory channels, magnetic disks, optical disks, magnetic tapes, network-attached storage (NAS) devices, network file systems, relational databases, or the like.

In one embodiment, reception logic 202 of data integrity protection mechanism 110 may be used to receive a call or request for task, such as data read or data write, from a software application 222. A read request refers to a read command (e.g., sys_read, such as a software application may use read( ) library function, which then calls system call sys_read) facilitated by an application 222 when attempting to read any portion (e.g., one or more data blocks) of the data at a storage device 232. In contrast, a write request refers to a write command (e.g., sys_write, such as a software application may use write( ) library function, which then calls system call sys_write) to further write one or more data blocks to the existing data at the storage device 232, including modifying the data, such as a software administrator or programmer changing the existing storage data. Submission logic 204 then submits or transmits the received request so that the requested task (e.g., read, write, etc.) can be performed to one or more relevant data blocks of the storage data, such as read or write one or more data blocks as set forth in the received request.

In one embodiment, reference logic 206 accesses integrity metadata cache associated with the relevant data blocks to determine whether any of the data blocks have a corresponding HMAC stored in the metadata cache. Integrity metadata cache might be organized as a collection of integrity metadata data blocks, where each block is intended to hold several integrity metadata records, such as holding HMACs. Integrity metadata data blocks may be stored on the same partition (block device) where real data blocks reside, or can be stored on a dedicated partition residing on the same or different storage device. If an integrity metadata data block, containing reference HMAC is missing from the cache, it may be read from appropriate location.

Meanwhile, calculation logic 208 uses a cryptographic key to calculate a new HMAC for each of the relevant data blocks. It is contemplated that the use of cryptographic keys to calculate HMACs is provided as an example and that embodiments of the invention are not limited to any particular processes or techniques. The cryptographic key may be received using any one or more of known processes, such as at initialization, at boot up, or may be supplied at any point during the process using any number of known methods. Further, using a combination of the cryptographic key and any of the known cryptographic functions (e.g., message digest algorithm 5 (MD5), secure hash algorithm 1 (SHA-1), etc.), an HMAC may be calculated for each relevant data block, such as HMAC-MD5, HMAC-SHA 1, etc. For example, an HMAC may be calculated using the following: HMAC $(K,m)=H((K \oplus opad) \| H((K \oplus ipad) \| m))$, where H refers to a cryptographic hash function, K refers to a secret key padded to the right with extra zeros to the input block size of the hash function, or the hash of the original key if its longer than that block size, m refers to the message (a data block, contents of the request, etc.) to be authenticated, $\|$ denotes concatenation, $\oplus$ denotes exclusive or (XOR), opad refers to an outer padding (e.g., 0x5c5c5c . . . 5c5c, one-block-long hexadecimal constant), and ipad refers to an inner padding (e.g., 0x363636 . . . 3636, one-block-long hexadecimal constant). For example, if a block size is 4K and HMAC-SHA256 size is 32 bytes, then a single block may have the ability to hold 128 HMACs. An integrity metadata cache may include integrity metadata (e.g., one or more HMACs, etc.) for a particular data block. For example, one 4K block of data might contain 128 HMAC-SHA256. Integrity metadata cache may refer to a collection of blocks (e.g., 4K blocks, etc.), containing the integrity metadata (HMACs) that is available in the random access memory.

When the request is a read request, in one embodiment, regardless of the HMAC calculation method employed by calculation logic 208, once the new HMAC is calculated for each data block, it is then compared with the reference HMAC for that data block by comparison logic 210. Upon comparison, a decision is made by decision block 214 as to whether the request is be granted or denied. For example, upon successful comparison, such as when there is a match between the newly-calculated HMAC and the referenced HMAC), the read request is granted and forwarded on to the upper layers to the requested task may be performed, such as the relevant data blocks are read. In contrast, upon unsuccessful comparison, such there is a mismatch between the calculated HMAC and the referenced HMAC, the read request is denied and an error message is issued and forwarded on to the upper layers and the requested task is not performed, such as the relevant data blocks are discarded and not read.

When the request is a write request, in one embodiment, regardless of the HMAC calculation method used by calculation logic 208, once the new HMAC is calculated for each data block that is to be written to the storage data, the corresponding reference HMAC for each data block is updated with or substituted by the newly-calculated HMAC for that data block using update logic 212. These newly-placed HMACs in the integrity metadata cache may then be referenced and compared in response to any future read requests.

It is contemplated that any number and type of components may be added to and/or removed from data integrity protection mechanism 110 to facilitate various embodiments of the invention including adding, removing, and/or enhancing certain features. For brevity, clarity, and ease of understanding of data integrity protection mechanism 110 many of the standard and/or known components, such as those of a computing device, are not shown or discussed here. It is contemplated that embodiments of the invention are not limited to any particular technology, topology, system, architecture, and/or standard and are dynamic enough to adopt and adapt to any future changes.

Figure 3:
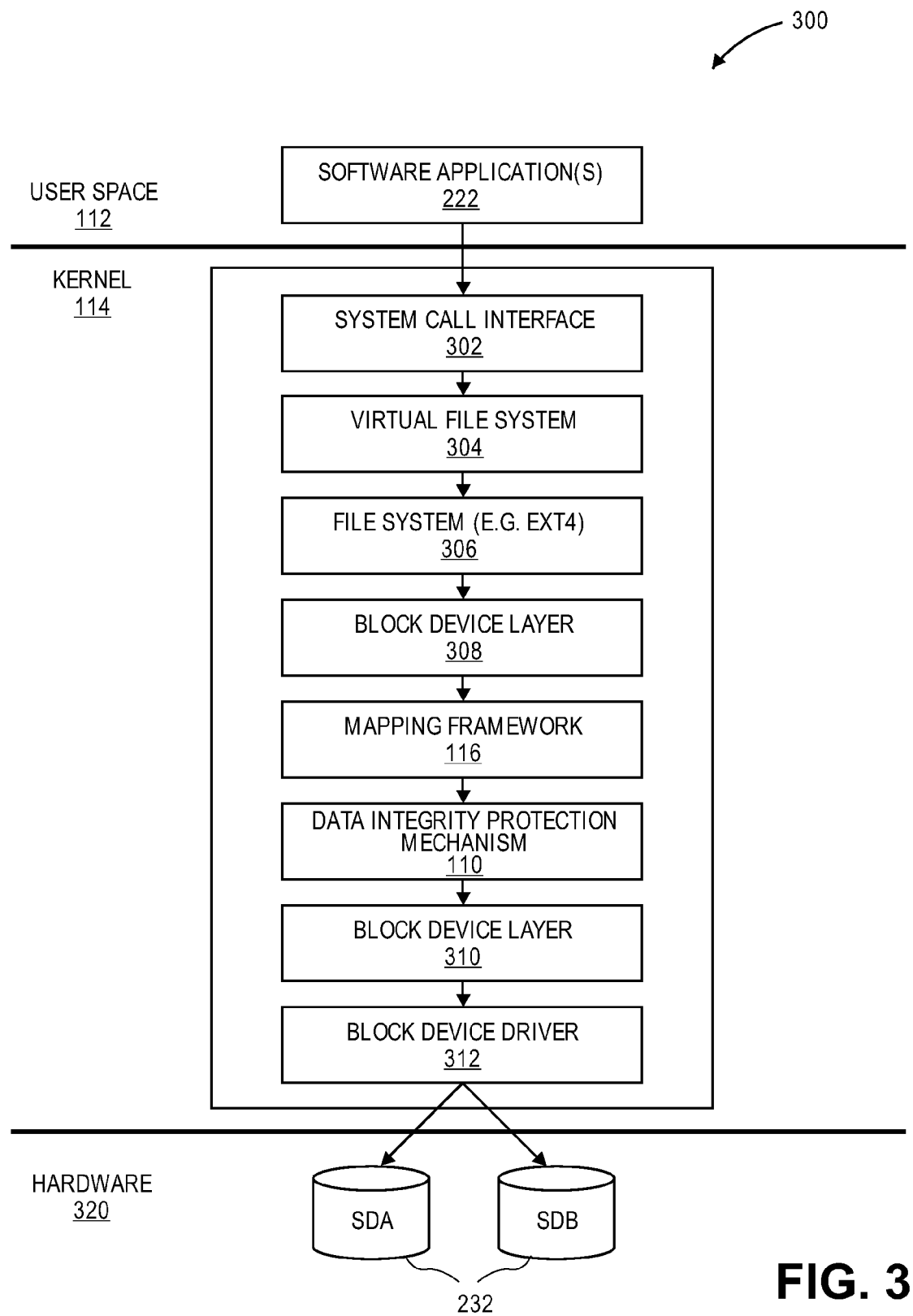
FIG. 3 illustrates a transaction sequence for facilitating security and protection of integrity storage data according to one embodiment.

FIG. 3 illustrates a transaction sequence for facilitating security and protection of integrity storage data according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, method 300 may be performed by data integrity protection mechanism 110 of FIG. 1.

Transaction sequence 300 begins with a software application 222 at user space 112 facilitating a call for a transaction (e.g., a read transaction (e.g., sys_read), a write transaction (e.g., sys_write), etc.). The request is then passed on to a virtual file system (VFS) 304 through a system call interface 302 at a kernel 114 of an operating system by having the system call interface 302 call on the VFS layer 304 (e.g., vfs_read, vfs_write, etc.). The VFS layer 304 calls on a file system layer 306 to read the request and forward it on to a block device layer 308. The file system layer 306 submits the request (e.g., block I/O read request) to the block device layer 308 which then queues the request to be received at a mapping framework or device mapper 116.

In one embodiment, the mapping framework 116 may forward the request to or map the request through data integrity protection mechanism 110 that may be provided as a plugin module for the mapping framework 116. In one embodiment, at data integrity protection mechanism 110 processes the request and submits it to a block device layer 310. The block device layer 310, in one embodiment, may include a data block device and corresponding integrity block device. The data block device may include real storage data, while the integrity block device may include relevant integrity metadata (e.g., reference HMACs). In one embodiment, as aforementioned, in case of a read request, data integrity protection mechanism 110 may calculate an HMAC and compare it with a reference HMAC, while in case of a write request, calculate an HMAC and store it in the integrity block device to be used as a reference HMAC in the future. The block device layer 310 then queues the request to a block device driver 312 so the requested task as set forth in the request may be performed. The block device driver 312 then performs the requested task relating to one or more data blocks of the storage data at the relevant hardware 320, such as storage devices 232 including sda and/or sdb.

Figure 4A:
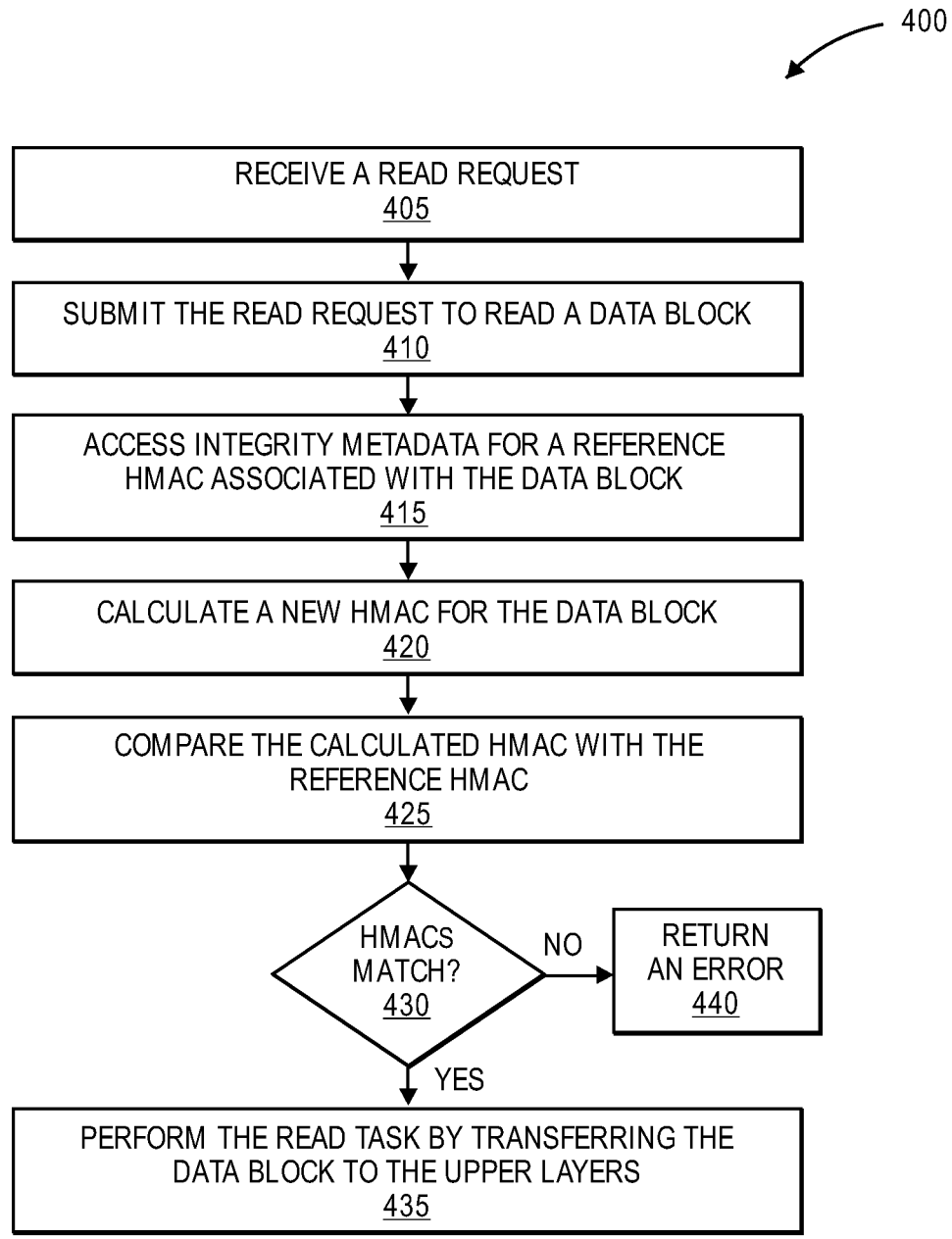
FIG. 4A illustrates a method for facilitating security and protection of integrity storage data when processing a read operation according to one embodiment.

FIG. 4A illustrates a method for facilitating security and protection of integrity storage data when processing a read operation according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by data integrity protection mechanism 110 of FIG. 1.

Method 400 begins at block 405 with a request being received from a software application (e.g., operating system or any other software application) running at a computing system to access and read a data block of data stored at a storage device that is in communication with the computing system. It is contemplated there is no limitation imposed as to how many or what type of data blocks may be read. In other words, a request may be received to read any number and type of data blocks. At block 410, the read request is submitted for processing so that the requested the data block may be read. At block 415, an integrity metadata cache associated with the data block is accessed to access a reference HMAC stored at the integrity metadata cache, where the reference HMAC corresponds to or references the requested data block. If a data block containing HMAC is missing or does not exist in the integrity metadata cache, reference logic 206 of FIG. 2 may submit a read request to the relevant block layer to read the data block from the block device.

At block 420, using a cryptographic key and any one or more of the known calculation processes, a new HMAC corresponding to the requested data block is calculated. At block 425, in one embodiment, the newly-calculated HMAC is compared with the reference HMAC obtained from the integrity metadata cache. At decision block 430, a determination is made as to whether the calculated HMAC matches the reference HMAC. If they match, at block 435, the process continues by granting the request and forwarding it to the upper layers on to the software application (at user space) facilitating the read request, such as the requested data block is read. If the match is not made, at block 440, the process is terminated and an error message is issued and forwarded on to the upper layers.

Figure 4B:
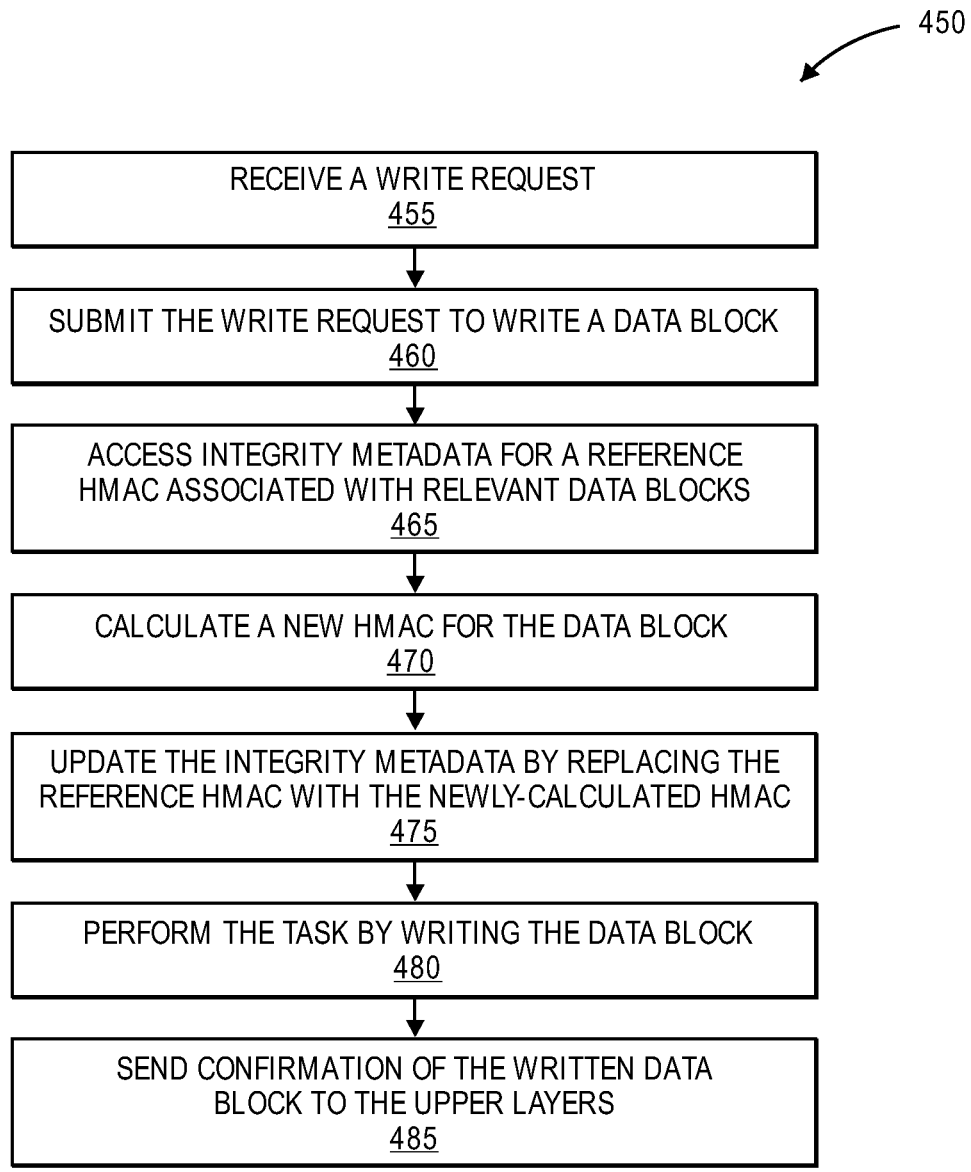
FIG. 4B illustrates a method for facilitating security and protection of integrity storage data when processing a write operation according to one embodiment.

FIG. 4B illustrates a method for facilitating security and protection of integrity storage data when processing a write operation according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed by data integrity protection mechanism 110 of FIG. 1.

Method 450 beings at block 455 with a request being received from a software application (e.g., operating system or any other software application) running at a computing system to write a data block to the existing data at a storage device that is in communication with the computing system. It is contemplated there is no limitation imposed as to how many or what type of data blocks may be read. In other words, a request may be received to read any number and type of data blocks. At block 460, the write request is submitted for processing so that the data block may be written. At block 465, an integrity metadata cache associated with the data block is accessed to access a reference HMAC stored at the integrity metadata cache, where the reference HMAC corresponds to or references the data block.

At block 470, using a cryptographic key and any one or more of the known calculation processes, a new HMAC corresponding to the requested data block is calculated. At block 475, in one embodiment, the integrity metadata cache is updated by replacing the existing reference HMAC with the newly-calculated HMAC. Further, update logic 212 of FIG. 2 may update the HMAC, but may not immediately send the write request to write an integrity block to the block device. At block 480, the process continues by granting the write request where the data block is written to the storage data. At block 485, a confirmation of the written data block is send to the upper layers.

Figure 5:
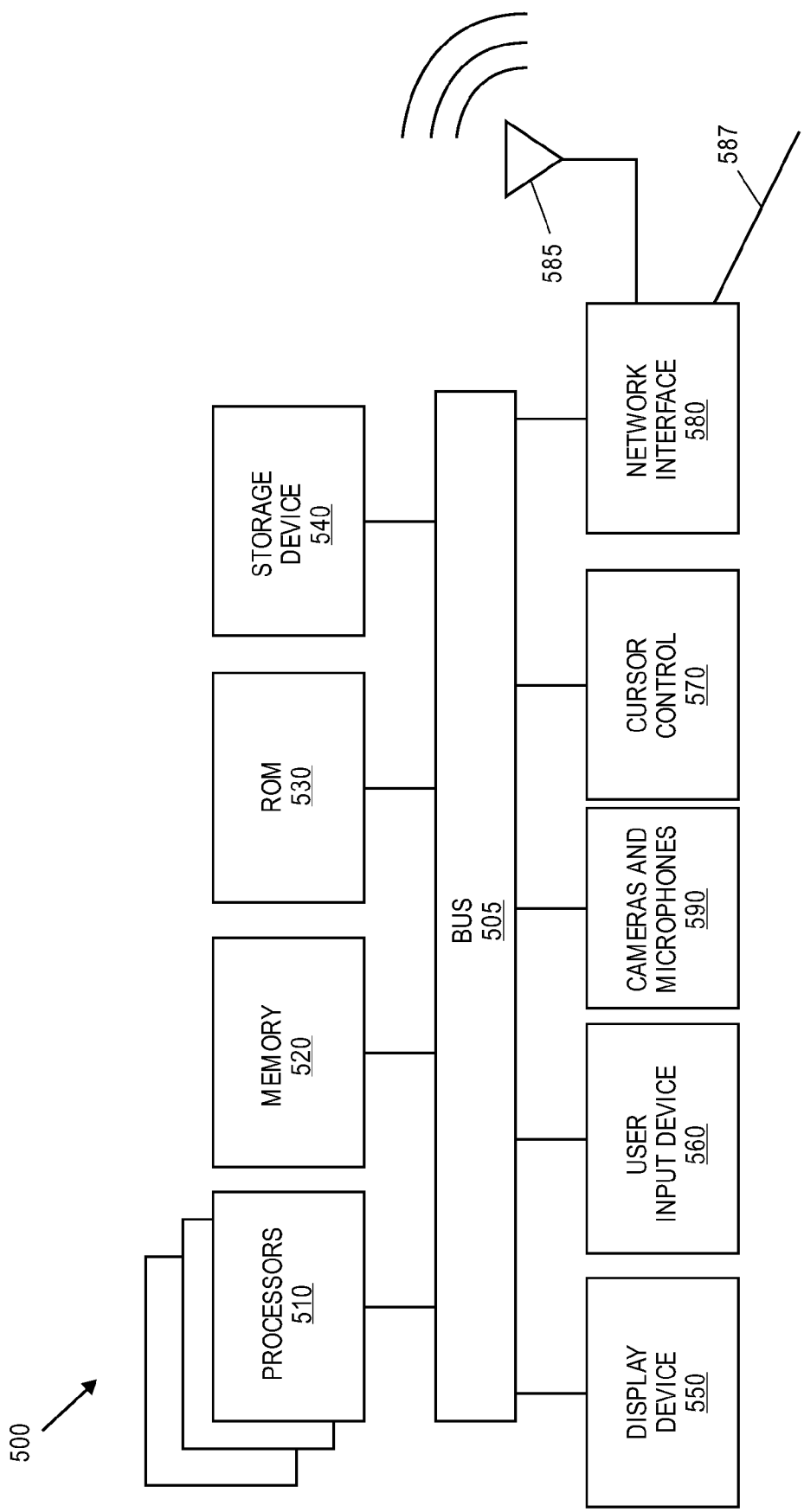
FIG. 5 illustrates computer system suitable for implementing embodiments of the present disclosure according to one embodiment of the invention.

FIG. 5 illustrates an embodiment of a computing system 500. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 500 includes bus 505 (or a link, an interconnect, or another type of communication device or interface to communicate information) and processor 510 coupled to bus 505 that may process information. While computing system 500 is illustrated with a single processor, electronic system 500 and may include multiple processors and/or co-processors, such as one or more of central processors, graphics processors, and physics processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: receiving a read request, from a software application at a computing device, to perform a read task relating to a first data block of data stored at a storage device coupled to the computing device, wherein the read task includes reading the first data block; accessing a first reference cryptographic code at a first metadata cache associated with the first data block; calculating a first new cryptographic code relating to the first data block; comparing the first new cryptographic code with the first reference cryptographic code; and accepting the read request if the first new cryptographic code matches the first reference cryptographic code, wherein accepting includes facilitating the read task.

Embodiments or examples include any of the above methods wherein further comprising denying the read request if the first new cryptographic code mismatches the first reference cryptographic code, wherein denying includes issuing an error message in response to the read request, wherein if a data block containing the first reference cryptographic code is missing from the first metadata cache, the read request is submitted to facilitate the read task to the missing data block.

Embodiments or examples include any of the above methods wherein the first reference and new cryptographic codes include a hash-based message authentication code (HMAC).

Embodiments or examples include any of the above methods wherein the software application comprises an operating system running at the computing device.

Embodiments or examples include any of the above methods further comprising receiving a write request, from the software application at a computing device, to perform a write task relating to a second data block, wherein the write task includes writing the second data block to the data stored at the storage device; accessing a second reference cryptographic code at a second metadata cache associated with the second data block; calculating a second new cryptographic code relating to the second data block; replacing the second reference cryptographic code by the second new cryptographic code in the second metadata cache; and accepting the write request, wherein accepting includes facilitating the write task.

Embodiments or examples include any of the above methods wherein the second metadata cache to maintain the second new cryptographic code such that the second new cryptographic code is used as a reference cryptographic code for future read requests.

Embodiments or examples include any of the above methods wherein the second reference and new cryptographic codes include a hash-based message authentication code (HMAC).

Embodiments or examples include any of the above methods wherein the software application comprises an operating system running at the computing device.

In another embodiment or example, an apparatus comprises: first logic to receive a read request, from a software application at a computing device, to perform a read task relating to a first data block of data stored at a storage device coupled to the computing device, wherein the read task includes reading the first data block; second logic to access a first reference cryptographic code at a first metadata cache associated with the first data block; third logic to calculate a first new cryptographic code relating to the first data block; forth logic to compare the first new cryptographic code with the first reference cryptographic code; and fifth logic to accept the read request if the first new cryptographic code matches the first reference cryptographic code, wherein accepting includes facilitating the read task.

Embodiments or examples include the apparatus above wherein the fifth logic is further to deny the read request if the first new cryptographic code mismatches the first reference cryptographic code, wherein denying includes issuing an error message in response to the read request, wherein if a data block containing the first reference cryptographic code is missing from the first metadata cache, the read request is submitted to facilitate the read task to the missing data block.

Embodiments or examples include the apparatus above wherein the first reference and new cryptographic codes include a hash-based message authentication code (HMAC).

Embodiments or examples include the apparatus above wherein the software application comprises an operating system running at the computing device.

Embodiments or examples include the apparatus above wherein the first logic is further to receive a write request, from the software application at a computing device, to perform a write task relating to a second data block, wherein the write task includes writing the second data block to the data stored at the storage device; the second logic is further to access second reference cryptographic code at a second metadata cache associated with the second data block; the third logic is further to calculate a second new cryptographic code relating to the second data block; the forth logic is further to replace the second reference cryptographic code by the second new cryptographic code in the second metadata cache; and the fifth logic is further to accept the write request, wherein accepting includes facilitating the write task.

Embodiments or examples include the apparatus above wherein the second metadata cache to maintain the second new cryptographic code such that the second new cryptographic code is used as a reference cryptographic code for future read requests.

Embodiments or examples include the apparatus above wherein the second reference and new cryptographic codes include a hash-based message authentication code (HMAC).

Embodiments or examples include the apparatus above wherein the software application comprises an operating system running at the computing device.

In another embodiment or example, a system comprises: a computing device having a memory to store instructions, and a processing device to execute the instructions, the computing device further having a mechanism to: receive a read request, from a software application at a computing device, to perform a read task relating to a first data block of data stored at a storage device coupled to the computing device, wherein the read task includes reading the first data block; access a first reference cryptographic code at a first metadata cache associated with the first data block; calculate a first new cryptographic code relating to the first data block; compare the first cryptographic code with the first reference cryptographic code; and accept the read request if the first new cryptographic code matches the first reference cryptographic code, wherein accepting includes facilitating the read task.

Embodiments or examples include the system above wherein the fifth logic is further to deny the read request if the first new cryptographic code mismatches the first reference cryptographic code, wherein denying includes issuing an error message in response to the read request, wherein if a data block containing the first reference cryptographic code is missing from the first metadata cache, the read request is submitted to facilitate the read task to the missing data block.

Embodiments or examples include the system above wherein the first reference and new cryptographic codes include a hash-based message authentication code (HMAC).

Embodiments or examples include the system above wherein the software application comprises an operating system running at the computing device.

Embodiments or examples include the system above wherein the first logic is further to receive a write request, from the software application at a computing device, to perform a write task relating to a second data block, wherein the write task includes writing the second data block to the data stored at the storage device; the second logic is further to access second reference cryptographic code at a second metadata cache associated with the second data block; the third logic is further to calculate a second new cryptographic code relating to the second data block; the forth logic is further to replace the second reference cryptographic code by the second new cryptographic code in the second metadata cache; and the fifth logic is further to accept the write request, wherein accepting includes facilitating the write task.

Embodiments or examples include the system above wherein the second metadata cache to maintain the second new cryptographic code such that the second new cryptographic code is used as a reference cryptographic code for future read requests.

Embodiments or examples include the system above wherein the second reference and new cryptographic codes include a hash-based message authentication code (HMAC).

Embodiments or examples include the system above wherein the software application comprises an operating system running at the computing device.

In another embodiment or example, an apparatus comprises means for performing any one or more of the operations mentioned above.

In yet another embodiment or example, at least one machine-readable medium comprising a plurality of instructions that in response to being executed on a computing device, causes the computing device to carry out a method according to any one or more of the operations mentioned above.

In yet another embodiment or example, at least one non-transitory or tangible machine-readable comprising a plurality of instructions that in response to being executed on a computing device, causes the computing device to carry out a method according to any one or more of the operations mentioned above.

In yet another embodiment or example, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:

receiving a read request, from a software application at a computing device, to perform a read task relating to a first data block of data stored at a storage device coupled to the computing device, wherein the read task includes reading the first data block;

accessing a first reference cryptographic code at a first metadata cache associated with the first data block, wherein accessing includes determining whether the first reference cryptographic code is associated with the first metadata cache being part of a plurality of integrity metadata data blocks, the first reference cryptographic code including an existing hash-based message authentication code (HMAC);

calculating a first new cryptographic code relating to the first data block, the first new cryptographic code including a new HMAC;

comparing the first new cryptographic code with the first reference cryptographic code;

accepting the read request if the first new cryptographic code matches the first reference cryptographic code, wherein accepting includes facilitating the read task;

denying the read request if the first new cryptographic code mismatches the first reference cryptographic code, wherein denying includes issuing an error message in response to the read request, wherein if a data block containing the first reference cryptographic code is missing from the first metadata cache, the read request is submitted to facilitate the read task to read the missing data block.

2. The method of claim 1, wherein the software application comprises an operating system running at the computing device.

3. The method of claim 1, further comprising:
receiving a write request, from the software application at a computing device, to perform a write task relating to a second data block, wherein the write task includes writing the second data block to the data stored at the storage device;
accessing a second reference cryptographic code at a second metadata cache associated with the second data block;
calculating a second new cryptographic code relating to the second data block;
replacing the second reference cryptographic code by the second new cryptographic code in the second metadata cache; and
accepting the write request, wherein accepting includes facilitating the write task.

4. The method of claim 3, wherein the second metadata cache to maintain the second new cryptographic code such that the second new cryptographic code is used as a reference cryptographic code for future read requests.

5. The method of claim 3, wherein the second reference cryptographic code includes another existing HMAC, wherein the second new cryptographic code includes another new HMAC.

6. The method of claim 3, wherein the software application comprises an operating system running at the computing device.

7. An apparatus comprising:
first logic, at least a portion of which is implemented as hardware, to receive a read request, from a software application at a computing device, to perform a read task relating to a first data block of data stored at a storage device coupled to the computing device, wherein the read task includes reading the first data block;
second logic, at least a portion of which is implemented as hardware, to access a first reference cryptographic code at a first metadata cache associated with the first data block, wherein accessing includes determining whether the first reference cryptographic code is associated with the first metadata cache being part of a plurality of integrity metadata data blocks, the first reference cryptographic code including an existing hash-based message authentication code (HMAC);
third logic, at least a portion of which is implemented as hardware, to calculate a first new cryptographic code relating to the first data block, the first new cryptographic code including a new HMAC;
fourth logic, at least a portion of which is implemented as hardware, to compare the first new cryptographic code with the first reference cryptographic code;
fifth logic, at least a portion of which is implemented as hardware, to accept the read request if the first new cryptographic code matches the first reference cryptographic code, wherein accepting includes facilitating the read task;

wherein the fifth logic, at least a portion of which is implemented as hardware, is further to deny the read request if the first new cryptographic code mismatches the first reference cryptographic code, wherein denying includes issuing an error message in response to the read request, wherein if a data block containing the first reference cryptographic code is missing from the first metadata cache, the read request is submitted to facilitate the read task to read the missing data block.

8. The apparatus of claim 7, wherein the software application comprises an operating system running at the computing device.

9. The apparatus of claim 7, wherein:
the first logic, at least a portion of which is implemented as hardware, is further to receive a write request, from the software application at a computing device, to perform a write task relating to a second data block, wherein the write task includes writing the second data block to the data stored at the storage device;
the second logic, at least a portion of which is implemented as hardware, is further to access second reference cryptographic code at a second metadata cache associated with the second data block, wherein accessing includes determining whether the first reference cryptographic code is associated with the first metadata cache being part of a plurality of integrity metadata data blocks, the first reference cryptographic code including an existing hash-based message authentication code (HMAC);
the third logic, at least a portion of which is implemented as hardware, is further to calculate a second new cryptographic code relating to the second data block, the first new cryptographic code including a new HMAC;
the fourth logic, at least a portion of which is implemented as hardware, is further to replace the second reference cryptographic code by the second new cryptographic code in the second metadata cache; and
the fifth logic, at least a portion of which is implemented as hardware, is further to accept the write request, wherein accepting includes facilitating the write task.

10. The apparatus of claim 9, wherein the second metadata cache to maintain the second new cryptographic code such that the second new cryptographic code is used as a reference cryptographic code for future read requests.

11. The apparatus of claim 9, wherein the second reference cryptographic code includes another existing HMAC, wherein the second new cryptographic code includes another new HMAC.

12. The apparatus of claim 9, wherein the software application comprises an operating system running at the computing device.

13. A system comprising:
a computing device having a memory to store instructions, and a processing device to execute the instructions, the computing device further having a mechanism to:
receive a read request, from a software application at a computing device, to perform a read task relating to a first data block of data stored at a storage device coupled to the computing device, wherein the read task includes reading the first data block;
access a first reference cryptographic code at a first metadata cache associated with the first data block, wherein accessing includes determining whether the first reference cryptographic code is associated with the first metadata cache being part of a plurality of integrity metadata data blocks, the first reference cryptographic code including an existing hash-based message authentication code (HMAC);

calculate a first new cryptographic code relating to the first data block, the first new cryptographic code including a new HMAC;

compare the first new cryptographic code with the first reference cryptographic code;

accept the read request if the first new cryptographic code matches the first reference cryptographic code, wherein accepting includes facilitating the read task; and deny the read request if the first new cryptographic code mismatches the first reference cryptographic code, wherein denying includes issuing an error message in response to the read request, wherein if a data block containing the first reference cryptographic code is missing from the first metadata cache, the read request is submitted to facilitate the read task to read the missing data block.

14. The system of claim 13, wherein the software application comprises an operating system running at the computing device.

15. The system of claim 13, wherein the mechanism is further to:

receive a write request, from the software application at a computing device, to perform a write task relating to a second data block, wherein the write task includes writing the second data block to the data stored at the storage device;

access second reference cryptographic code at a second metadata cache associated with the second data block;

calculate a second new cryptographic code relating to the second data block;

replace the second reference cryptographic code by the second new cryptographic code in the second metadata cache; and accept the write request, wherein accepting includes facilitating the write task.

16. The system of claim 15, wherein the second metadata cache to maintain the second new cryptographic code such that the second new cryptographic code is used as a reference cryptographic code for future read requests.

17. At least one non-transitory machine-readable storage medium comprising a plurality of instructions that in response to being executed on a computing device, causes the computing device to carry out a method according to one or more operations comprising:

receive a read request, from a software application at a computing device, to perform a read task relating to a first data block of data stored at a storage device coupled to the computing device, wherein the read task includes reading the first data block;

access a first reference cryptographic code at a first metadata cache associated with the first data block, wherein accessing includes determining whether the first reference cryptographic code is associated with the first metadata cache being part of a plurality of integrity metadata data blocks, the first reference cryptographic code including an existing hash-based message authentication code (HMAC);

calculate a first new cryptographic code relating to the first data block, the first new cryptographic code including a new HMAC;

compare the first new cryptographic code with the first reference cryptographic code;

accept the read request if the first new cryptographic code matches the first reference cryptographic code, wherein accepting includes facilitating the read task; and deny the read request if the first new cryptographic code mismatches the first reference cryptographic code, wherein denying includes issuing an error message in response to the read request, wherein if a data block containing the first reference cryptographic code is missing from the first metadata cache, the read request is submitted to facilitate the read task to read the missing data block.

18. The non-transitory machine-readable storage medium of claim 17, wherein the software application comprises an operating system running at the computing device.

19. The non-transitory machine-readable storage medium of claim 17, wherein the one or more operations further comprise:

receive a write request, from the software application at a computing device, to perform a write task relating to a second data block, wherein the write task includes writing the second data block to the data stored at the storage device;

access a second reference cryptographic code at a second metadata cache associated with the second data block;

calculate a second new cryptographic code relating to the second data block;

replace the second reference cryptographic code by the second new cryptographic code in the second metadata cache; and accept the write request, wherein accepting includes facilitating the write task.

20. The non-transitory machine-readable storage medium of claim 19, wherein the second metadata cache to maintain the second new cryptographic code such that the second new cryptographic code is used as a reference cryptographic code for future read requests.

21. The non-transitory machine-readable storage medium of claim 19, wherein the second reference cryptographic code includes another existing HMAC, wherein the second new cryptographic code includes another new HMAC.

22. The non-transitory machine-readable storage medium of claim 19, wherein the software application comprises an operating system running at the computing device.

* * * * *